US009686716B2

(12) United States Patent
Reider et al.

(10) Patent No.: US 9,686,716 B2
(45) Date of Patent: Jun. 20, 2017

(54) INTRODUCING SIMPLE RLC FUNCTIONALITY TO NODE B (71) Applicant: Telefonaktiebolaget L M Ericsson (publ), Stockholm (SE)

(72) Inventors: Norbert Reider, Tényö (HU); Szilveszter Nádas, Budapest (HU); Sándor Rácz, Cegléd (HU)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 132 days.

(21) Appl. No.: 14/438,119

(22) PCT Filed: Oct. 26, 2012

(86) PCT No.: PCT/EP2012/004482
§ 371 (c)(1),
(2) Date: Apr. 23, 2015

(87) PCT Pub. No.: WO2014/063718
PCT Pub. Date: May 1, 2014

(65) Prior Publication Data
US 2015/0289165 A1 Oct. 8, 2015

(51) Int. Cl.
*H04W 28/06* (2009.01)
*H04W 28/02* (2009.01)
(Continued)

(52) U.S. Cl.
CPC ........... *H04W 28/065* (2013.01); *H04L 47/32* (2013.01); *H04L 47/34* (2013.01); *H04W 24/08* (2013.01);
(Continued)

(58) Field of Classification Search
CPC .. H04W 28/0289; H04W 28/06; H04L 47/12; H04L 47/14; H04L 47/32; H04L 47/34
See application file for complete search history.

(56) References Cited

U.S. PATENT DOCUMENTS

| 2002/0082023 A1 | 6/2002 | Bark et al. |
| 2006/0034175 A1 | 2/2006 | Herrmann |
| 2015/0029998 A1* | 1/2015 | Sayenko ........... H04W 36/0016 370/331 |

FOREIGN PATENT DOCUMENTS

| EP | 1 771 023 A1 | 4/2007 |
| WO | WO 2009058084 A1 | 5/2009 |

(Continued)

OTHER PUBLICATIONS

International Search Report, PCT Application No. PCT/EP2012/004482, mailed Jun. 18, 2013, 5 pages.
(Continued)

*Primary Examiner* — Pao Sinkantarakorn
(74) *Attorney, Agent, or Firm* — Sage Patent Group (57) ABSTRACT

Techniques for processing downlink data transmitted in a mobile communication system between a control node of a radio access network and a mobile terminal are disclosed. A method of processing downlink data transmitted in the mobile communication system between the control node and the mobile terminal includes determining, in a radio access node of the radio access network, at least one Radio Link Control (RLC) Protocol Data Unit (PDU) from a plurality of RLC PDUs transmitted by the control node. The determined at least one RLC PDU contains a payload. The method further includes creating, in the radio access node, at least one replacement RLC PDU to be further used instead of the determined at least one RLC PDU. The at least one replacement RLC PDU contains a payload which size is smaller than the size of the payload of the determined at least one RLC PDU.

22 Claims, 8 Drawing Sheets (51) Int. Cl.

| | | |
|---|---|---|
| *H04L 12/823* | (2013.01) | |
| *H04L 12/801* | (2013.01) | |
| *H04W 24/08* | (2009.01) | |
| *H04W 72/04* | (2009.01) | |
| *H04L 1/00* | (2006.01) | |
| *H04L 1/16* | (2006.01) | |
| *H04L 1/18* | (2006.01) | |

(52) U.S. Cl.
CPC ... *H04W 28/0284* (2013.01); *H04W 28/0289* (2013.01); *H04W 28/06* (2013.01); *H04W 72/042* (2013.01); *H04L 1/0005* (2013.01); *H04L 1/1642* (2013.01); *H04L 1/1829* (2013.01)

(56) References Cited

FOREIGN PATENT DOCUMENTS

| WO | WO 2011/120581 A1 | 10/2011 | | |
|---|---|---|---|---|
| WO | WO 2011/147468 A1 | 12/2011 | | |
| WO | WO 2012/057667 | * | 5/2012 | ............. H04L 12/56 |

OTHER PUBLICATIONS

Written Opinion of the International Searching Authority, PCT Application No. PCT/EP2012/004482 mailed Jun. 18, 2013, 7 pages.

Nádas et al: "HSPA Transport Network Layer Congestion Control" EURASIP Journal on Wireless Communications and Networking, XP003028200, 43 pages, Year: 2010.

Nádas et al: "HSUPA Transport Network Congestion Control", EURASIP, Journal on Wireless Communications and Networking, vol. 2009, Jan. 1, 2009; XP003028200, 11 pages.

Nádas et al: "Providing congestion control in the Iub Transport Network for HSDPA", Global Telecommunications Conference, 2006. GLOBECOM '06. IEEE, PI, Nov. 26, 2007, pp. 5293-5297, XP002522633.

3GPP TS 25.322 v10.1.0 (Jun. 2011) "3$^{rd}$ Generation Partnership Project; Technical Specification Group Radio Access Network; Radio Link Control (RLC) protocol specification (Release 10)" Mobile Competence Centre; 650 Route Des Lucioles; F-06921 Sophia-Antipolis Cedex; France; 88 pages.

* cited by examiner

INTRODUCING SIMPLE RLC FUNCTIONALITY TO NODE B

CROSS REFERENCE TO RELATED APPLICATION

This application is a 35 U.S.C. §371 national stage application of PCT International Application No. PCT/EP2012/004482, filed on 26 Oct. 2012, the disclosure and content of which is incorporated by reference herein in its entirety. The above-referenced PCT International Application was published in the English language as International Publication No. WO 2014/063718 A1 on 1 May 2014.

TECHNICAL FIELD

The invention generally relates to the field of downlink data processing. More specifically, the invention relates to a technique of processing downlink data transmitted in a mobile communication system between a control node of a radio access network and a mobile terminal.

BACKGROUND

High-Speed Downlink Packet Access (HSDPA, also known as High-Speed Data Packet Access) is a third generation (3G) mobile communications system in the High-Speed Packet Access (HSPA) family and is provided to optimize downlink performance. HSDPA allows networks, like 3G networks based on the Universal Mobile Telecommunications System (UMTS), to have higher (downlink) data transfer speeds and capacity.

Wideband Code Division Multiple Access (WCDMA) UMTS communication networks usually comprise a plurality of Radio Network Controllers (RNCs), each of the RNCs being connected to a plurality of base stations (radio transceivers or radio access nodes), also called Node Bs or NodeBs, via a corresponding Transport Network (TN). The RNCs are typically connected with each other via a core network. The Node Bs wirelessly communicate with communication devices, e.g. mobile terminals, which are usually called User Equipments (UEs) in terms of UMTS.

In a HSDPA network, usually there are two main sources of capacity limitation: First, the radio link that transmits information over the air between one of the base stations (Node Bs) and one of the UEs, and (2) the transport link or TN link that connects one of the Node Bs to the associated RNC. Over the Internet, the Transmission Control Protocol (TCP) provides efficient congestion control mechanisms. However, TCP is not suitable to resolve congestion situations between the RNC and the UE, since the Radio Link Control (RLC) protocol in Acknowledged Mode (AM) provides reliable transmission between the two. This means that the RLC AM protocol retransmits the lost packets between the RNC and the UE. Thus, the TCP does not experience packet losses and does not initiate its congestion avoidance mechanism, i.e., it continues sending more packets into the network.

When the TN is the bottleneck in the HSDPA system, solutions have been introduced to handle the TN level congestion situations and these mechanisms are widely deployed in real HSDPA networks today. The Iub (in terms of UMTS, the Iub interface interconnects the RNC to the Node B) Framing Protocol (FP) has been introduced to be responsible for congestion detection. Standardized signaling messages are also available to inform the RNC about the TN congestion. For example, a detailed description of the TN congestion control mechanism, as well as the Iub FP can be found in "HSPA Transport Network Layer Congestion Control" by Szilveszter Nádas, Sándor Racz and Pál L. Pályi, which was published as a book chapter in "Handbook of HSDPA/HSUPA Technology".

In HSDPA, the RLC AM protocol is responsible for reliable data transmissions in Layer 2 between the RNC and the UE. This is described in 3GPP TS 25.322, Radio Link Control (RLC) protocol specification. Each RLC AM entity consists of a transmitting and a receiving side. An AM RLC entity can act either as a Sender or as a Receiver depending on the elementary procedure, where the Sender is the transmitter of the RLC AM Protocol Data Units (PDUs) and the Receiver receives and processes the transmitted RLC AM PDUs.

Due to the reliable transmission of RLC AM, it provides seamless handover and channel switching operations. Data packets lost between the RNC and UE due to bad radio or TN link conditions are retransmitted, thus non-congestion related packet loss is avoided, which is beneficial for TCP in terms of utilizing network capabilities. On the other hand, RLC retransmissions can increase the round trip time (RTT) significantly. In addition, reliable packet delivery of RLC makes it impossible to drop or re-order packets (e.g., to indicate TN or radio congestion).

A HSDPA congestion control mechanism is conceivable using which TN congestion is detected at Iub FP level. This may be referred to as AQM Based Congestion Control (ABCC). When TN congestion is detected the application level TCP is informed about this congestion event. In order to inform the TCP about the TN congestion an application level Internet Protocol (IP) packet is dropped. The lost (dropped) packet is then retransmitted over the TN by the RLC protocol. Thus, a lost packet over the TN (lost RLC PDU) does not result in RLC Service Data Unit (SDU) loss because of the retransmission of the RLC AM protocol. That is, the transport network congestion is detected using the current HSDPA flow-control as described in "HSPA Transport Network Layer Congestion Control" by Szilveszter Nádas, Sándor Racz and Pál L. Pályi. However, instead of shaping the flow in the RNC, the application level TCP is notified about TN congestion and the TCP handles the TN congestion.

Further, Quality of Service (QoS) differentiation within the same bearer in the base station is desirable in HSDPA networks. QoS differentiation aims to ensure priority of important or delay sensitive data traffic during scheduling. For instance, the delay sensitive and small-sized Voice over IP (VoIP) frames should be prioritized over File Transport Protocol (FTP) packets in case of a full buffer situation of the base station.

In HSDPA networks, QoS differentiation within the same bearer in the Node B is an unsolved problem. Since in the Node B all packets are within the RLC AM loop, the dropping (or prioritization) of the RLC PDUs is not possible. Even if the order of the RLC PDUs in the queue of the Uu scheduler (in terms of UMTS, the Uu interface is the radio interface between the radio access network and the mobile terminal) in the Node B could be changed, the UE-side RLC layer would not deliver data to higher layers, since it provides in-sequence delivery of IP packets to higher layers (see 3GPP TS 25.322, Radio Link Control (RLC) protocol specification).

In HSDPA, currently there is no solution for supporting QoS differentiation within the same bearer in the Node B. Since the RLC AM protocol provides ordered delivery of packets to higher layers, the problem is how to change the order of the RLC PDUs in the Node B such that e.g., RLC SDU-2 (transmitted after RLC SDU-1) is delivered earlier to higher layers than RLC SDU-1.

SUMMARY

Accordingly, there is a need to provide an improved and more efficient technique for downlink data processing.

According to a first aspect, a method of processing downlink data transmitted in a mobile communication system between a control node of a radio access network and a mobile terminal is provided. The method comprises: determining, in a radio access node of the radio access network, at least one Radio Link Control, RLC, Protocol Data Unit, PDU, from a plurality of RLC PDUs transmitted by the control node, the determined at least one RLC PDU containing a payload; and creating, in the radio access node, at least one replacement RLC PDU to be further used instead of the determined at least one RLC PDU, wherein the at least one replacement RLC PDU contains a payload which size is smaller than the size of the payload of the determined at least one RLC PDU.

By means of the method according to the first aspect, congestion over a Transport Network (TN) provided between the control node and the radio access node as well as congestion over a radio link provided between the radio access node and the mobile terminal may be handled. Alternatively or additionally, QoS differentiation may be provided by means of the method according to the first aspect.

The determined at least one RLC PDU containing the payload does not necessarily have to be present or arrived at the radio access node. In other words, not all of the RLC PDUs transmitted by the control node have to arrive at the radio access node and the determined at least one RLC PDU may be one of the transmitted RLC PDUs which has not arrived at the radio access node. It is, for example, conceivable that one or more of the RLC PDUs transmitted by the control node do not arrive (are not received) at the radio access node due to transport network link congestion. The radio access node may be adapted to detect or identify the missing or lost one or more RLC PDUs. In this context, the missing or lost one or more RLC PDUs may be determined by the control node as the determined at least one RLC PDU. The radio access node may then create the at least one replacement RLC PDU such that the payload of each of the at least one replacement RLC PDU is smaller than the payload of the one or more lost or missing RLC PDUs transmitted by the control node (but not arrived at the radio access node due to transport network link congestion). For example, the payload size of the lost or missing RLC PDUs (not arrived at the radio access node) may be estimated based on the payload size of one or more previously received RLC PDUs or may be estimated based on an average value of the payload size of one or more RLC PDUs received over a certain time period. The payload size of the created at least one replacement RLC PDU may then be chosen to be smaller than the estimated payload size. The created at least one replacement RLC PDU may then be inserted, in the radio access node, at the position of the missing or lost one or more RLC PDUs in the downlink data flow originally transmitted by the control node. The insertion of the created at least one replacement RLC PDU may also be understood as replacement, although the "replaced" RLC PDU is not present in the radio access node, but has been lost on the transport network.

The determined at least one RLC PDU may be one of the transmitted RLC PDUs which have arrived at the radio access node. That is, the determined RLC PDU may be received at the radio access node. It is, for example, conceivable that radio link congestion occurs between the radio access node and the mobile terminal. In this context, one or more RLC PDUs to be transmitted or intended to be transmitted by the radio access node to the mobile terminal may be selected or identified as the determined at least one RLC PDU. For example, the one or more RLC PDUs to be input next into or to be forwarded next to a transmission scheduler, e.g. an Uu scheduler in terms of UMTS, may be selected or identified as the at least one replacement RLC PDU. The transmission scheduler may be included in the radio access node. The radio access node may then create the at least one replacement RLC PDU such that the payload of each of the at least one replacement RLC PDU is smaller than the payload of the one or more selected or identified RLC PDUs to be transmitted or intended to be transmitted by the radio access node. Said one or more selected or identified RLC PDUs may then be replaced by the at least one replacement RLC PDU at the position of said selected or identified one or more RLC PDUs in the downlink data flow.

It is also, for example, conceivable that the at least one RLC PDU is determined in order to perform priority or QoS differentiation. In this context, one or more RLC PDUs to be transmitted or intended to be transmitted by the radio access node to the mobile terminal may be selected or identified as the determined at least one RLC PDU. For example, when an RLC PDU of a priority which is higher than a predetermined priority arrives at the radio access node, the radio access node may select one or more RLC PDUs previously arrived at the radio access node as the determined at least one RLC PDU. For instance, the radio access node may select or identify the one or more RLC PDUs preceding the newly arrived RLC PDU with the priority being equal to or higher than the predetermined priority as the determined at least one RLC PDU. The radio access node may then create the at least one replacement RLC PDU such that the payload of each of the at least one replacement RLC PDU is smaller than the payload of the one or more selected or identified RLC PDUs to be transmitted or intended to be transmitted by the radio access node. Said one or more selected or identified RLC PDUs may then be replaced by the at least one replacement RLC PDU at the position of said selected or identified one or more RLC PDUs in the downlink data flow. For example, if it is determined that the priority of an RLC PDU is higher than the highest priority of one or more RLC PDUs in the transmission scheduler, the one or more of said RLC PDUs in the transmission scheduler may be selected as the determined at least one RLC PDU. In other words, the predetermined priority may be the highest priority of RLC PDU in the queue of the transmission scheduler. In consequence, one or more RLC PDUs queued in the transmission scheduler may be replaced when an RLC PDU having higher priority than the one or more others in the queue of the transmission scheduler is received.

Independent of the specific realization of the method according to the first aspect, the determined at least one RLC PDU may comprises a packet according to a higher layer protocol related to the downlink data. The packet according the higher layer protocol may comprise header data and payload data. The size of the payload of the replacement RLC PDU may be equal to or smaller than the size of the header data of the packet according to the higher layer protocol. For example, the replacement RLC PDU payload may consist of the header of the packet according to said higher layer protocol or at least part of the header of the packet according to said higher layer protocol. It is also conceivable that the size of the payload of the replacement RLC PDU may be larger than the size of the header data of the packet according to the higher layer protocol, but smaller than the size of the packet according to the higher layer protocol. For example, the replacement RLC PDU payload may consist of the header of the packet according to said higher layer protocol and one or more additional bytes.

The higher layer protocol may be the Internet Protocol (IP).

It is conceivable that the size of each of the at least one replacement RLC PDU payload may be the minimum valid length of the packet according to the higher layer protocol. For example, the size of each of the at least one replacement RLC PDU payload may be 20 bytes which is the size of an IP header or zero bytes, just to give to possible examples. However, any other suitable value, e.g. any other suitable value between 0 bytes and 20 bytes, is also conceivable.

The mobile communication system may be a Universal Mobile Telecommunications System, UMTS, communication system. Alternatively or additionally, the radio access network may be a UMTS Terrestrial Radio Access Network, UTRAN. Alternatively or additionally, the control node may be a Radio Network Controller, RNC. Alternatively or additionally, the radio access node may be a Node B. Alternatively or additionally, the mobile terminal may be a User Equipment, UE.

In accordance with a first possible realization of the method according to the first aspect, the step of determining may be triggered when congestion of the downlink data in a transport network provided between the control node and the radio access node is detected.

The at least one RLC PDU may be determined by identifying, in the radio access node, which of the plurality of RLC PDUs is or are not received at the radio access node. For example, congestion on the transport network may be the reason for at least one RLC PDU of the plurality to not arrive or to be not received at the radio access node. The radio access node may then insert the at least one replacement RLC PDU at the position of the lost at least one RLC PDU. In this way, when TN is congested and one or more RLC PDUs are lost, the lost one or more RLC PDUs may be detected in the radio access node and one or more new empty or minimum sized RLC PDUs may be created (to be used instead of the lost RLC PDU(s)) in order to be acknowledged by the mobile terminal and not retransmitted over the congested transport network.

In accordance with a second possible realization of the method according to the first aspect, which may be implemented independent from or in combination with the first possible realization of the method according to the first aspect, the step of determining may be triggered when congestion of the downlink data on a radio link provided between the radio access node and the mobile terminal is detected.

The at least one RLC PDU may be determined by detecting, in the radio access node, that the at least one RLC PDU is the next RLC PDU to be input into or to be forwarded to a transmission scheduler contained in the radio access node. The transmission scheduler may be configured for scheduling transmission of RLC PDUs to the mobile terminal. For example, the transmission scheduler may be configured for transmission scheduling according to a first-in-first-out (FIFO) scheme. For example, if congestion is detected on the radio link, the step of determining may be triggered in accordance with the second possible realization of the method according to the first aspect. In this respect, it is conceivable that the next at least one RLC PDU to be input into or to be forwarded to the transmission scheduler may be selected as the determined at least one RLC PDU. For example, multiple RLC PDUs may be contained in the transmission scheduler (which may also be referred to as transmission queue or transmission buffer or, in terms of UMTS, as a Uu scheduler) of the radio access node and the next at least one RLC PDU to be input into or to be forwarded to said transmission scheduler may be selected as the determined at least one RLC PDU.

The step of creating may comprise the step of reducing, in the radio access node, the payload contained in the determined at least one RLC PDU. Alternatively, the step of creating may comprise the step of creating, in the radio access node, a new payload to be contained in the at least one replacement RLC PDU or the step of newly creating the at least one replacement RLC PDU. All of the aforementioned possibilities are conceivable when radio link congestion is detected.

In order to determine the at least one RLC PDU, e.g., the at least one lost RLC PDU (in case of TN congestion) or the at least one next RLC PDU to be input into the transmission scheduler (in case of radio link congestion), the method may further comprise the step of parsing the headers of at least a subset of the plurality of RLC PDUs. The subset may comprise any conceivable number, i.e. one or more RLC PDUs. For example, the headers of all RLC PDUs received at the radio access node may be parsed. By parsing the header it may be determined whether the RLC PDU having the parsed header is a RLC Data PDU, i.e., a RLC PDU containing a payload, or an RLC PDU having no payload, e.g., an RLC Status PDU.

The step of determining may further comprise reading, in the radio access node, the sequence number of at least a subset of the plurality of RLC PDUs to determine the sequence number of the at least one replacement RLC PDU. The step of reading the sequence number(s) may, for example, only be performed if it has been previously determined in the parsing step that the RLC PDU is a RLC Data PDU. Otherwise the reading step may be skipped.

If congestion of the downlink data occurs in the transport network, at least one RLC PDU of the plurality of RLC PDUs may be lost over the transport network due to the transport network congestion. In this case, the sequence number of the lost at least one RLC PDU may be determined, in the radio access node, by identifying one or more gaps between RLC PDUs received at the radio access node. For example, a gap between an RLC PDU having sequence number 19 and an RLC PDU having sequence number 21 indicates that the RLC PDU having sequence number 20 is missing and has been lost on the transport network link.

If congestion of the downlink data occurs on the radio link, the sequence number of the determined RLC PDUs to be replaced by the created at least one replacement RLC PDU may be read before replacement.

After creating the at least one replacement RLC PDU to be used instead of the determined at least one RLC PDU, different options of handling the information about the determined at least one RLC PDU, e.g. the identified or read out sequence number of the RLC PDU, are conceivable.

According to a first possible option, the method may further comprise the step of sending, by the radio access node, the sequence number of the at least one replacement RLC PDU to the control node of the mobile communication system. In accordance therewith, the method may further comprise the step of retransmitting, by the control node, at least one replacement RLC PDU corresponding to the received sequence number. For example, the control node may use the received sequence number to create a retransmitted RLC PDU containing a payload which size is smaller than the size of the payload of the originally transmitted RLC PDU having said sequence number. The payload of the retransmitted RLC PDU may have the same size as described herein with respect to the size of the replacement RLC PDU.

According to a second possible option, the sequence number of the at least one replacement PDU may not be transmitted to the control node. In accordance with a variant of the second possible option, the method may further comprise the step of temporarily storing the sequence number of the at least one replacement RLC PDU in the radio access node. In this respect, the method may further comprise the steps of identifying, in the radio access node, whether the sequence number of at least one of the plurality of RLC PDUs corresponds to the stored sequence number, and replacing, in the radio access node, the identified at least one RLC PDU with at least one replacement RLC PDU. In accordance with the variant of the second option, the radio access node may compare the sequence numbers of each of the received RLC PDUs with the stored sequence number(s). If the radio access node identifies a match between a sequence number of one of the received RLC PDUs and the stored sequence number, it concludes that the respective received RLD PDU has been retransmitted. The radio access node may then create a replacement RLC PDU having a smaller payload size than the identified received RLC PDU by reusing the stored sequence number. The created replacement RLC PDU may then be used instead of the identified RLC PDU.

As described above, when congestion occurs, the radio access node may parse the headers of at least a subset of the received RLC Data PDUs. Further, the radio access node may create one or more empty or minimum sized RLC PDUs. For this purpose, the read RLC sequence number(s) may be used. Thus, at least one empty or minimum sized RLC PDU may be sent from the radio access node towards the mobile terminal to indicate packet loss, and thus, the congestion for TCP. In this way, the utilization of the radio and transport network links may be increased by avoiding transmitting data that will be dropped at the receiver side and/or decreasing end-to-end RTT.

The number of the at least one replacement RLC PDU may correspond to the number of the determined at least one RLC PDU. For example, multiple replacement RLC PDUs may be created to be used instead, e.g. to replace, a corresponding number of multiple determined RLC PDUs.

When the at least one determined RLC PDU contains only a fraction of an RLC Service Data Unit, SDU, the method may further comprise the step of creating multiple replacement RLC PDUs depending on the number of the plurality of RLC PDUs belonging to said SDU. The multiple replacement RLC PDUs may then be used instead of the corresponding number of multiple RLC PDUs related to the RLC SDU.

In accordance with a third possible realization of the method according to the first aspect, which may be implemented independent from or in combination with the first possible realization and/or the second possible realization of the method according to the first aspect, the method may further comprise the step of monitoring, in the radio access node, the priority of the plurality of RLC PDUs.

The step of determining may comprise selecting at least one RLC PDU ahead of an RLC PDU having a priority that is higher than a predetermined priority as the at least one RLC PDU to be replaced. In this way, higher priority packets can be prioritized over lower priority packets. For example, an RLC PDU ahead of an RLC PDU having a QoS equal to or higher than a predetermined QoS may be selected as the at least one RLC PDU to be replaced. It is conceivable that a plurality of RLC PDUs is contained in the transmission scheduler, e.g., a priority queue, of the radio access node to be transmitted in a FIFO manner to the mobile terminal. When an RLC PDU is forwarded to the priority queue the priority of said RLC PDU may be determined. If the priority is equal to or higher than the predetermined priority one or more RLC PDUs having a lower priority and being ahead of said RLC PDU may be replaced with a corresponding number of replacement RLC PDUs, e.g., with a corresponding number of empty or minimum-sized RLC PDUs.

In this way, the utilization of the radio and transport network links may be increased by providing QoS differentiation within the same bearer by the dropping of low priority packets.

According to a second aspect, a computer program product is proposed, comprising program code portions for performing steps of any one of the method aspects described herein, when the computer program product is run on one or more computing devices. The computer program product may be stored on a computer readable recording medium.

According to a third aspect, a processing apparatus for processing downlink data transmitted in a mobile communication system between a control node of a radio access network and a mobile terminal is provided. The processing apparatus comprises: a determining component for determining at least one Radio Link Control, RLC, Protocol Data Unit, PDU, from a plurality of RLC PDUs transmitted by the control node, the determined RLC PDU containing a payload; and a creating component for creating at least one replacement RLC PDU to be further used instead of the determined at least one RLC PDU, wherein the at least one replacement RLC PDU contains a payload which size is smaller than the size of the payload of the determined at least one RLC PDU.

All details of the method according to the first aspect as described herein may equally be implemented by suitable components in the processing apparatus according to the second aspect.

A radio access node may comprise the processing apparatus. In other words, the processing apparatus according to the third aspect may be contained in the radio access node. The radio access node may be a NodeB.

According to a fourth aspect, a mobile communication system comprising a radio access network and a mobile terminal is provided. The radio access network comprises a radio access node as described herein and a control node.

BRIEF DESCRIPTION OF THE DRAWINGS

In the following, the invention will further be described with reference to exemplary embodiments illustrated in the figures, in which.

DETAILED DESCRIPTION

In the below, for purposes of explanation and not limitation, specific details are set forth in order to provide a thorough understanding of the present invention. It will be apparent to one skilled in the art that the present invention may be practiced in other embodiments that depart from these specific details. For example, although the exemplary embodiments are described in connection with UMTS standard terminology to illustrate the present invention, they are equally applicable to other kinds of mobile communication systems. Also, the invention may be practiced in any network to which mobile users may attach. For example, the present invention is applicable to, besides cellular networks, Local Area Networks (LANs), Wireless LANs (WLANs), or similar wireless networks, but also to wireline networks such as, for example, the intranet of a company or the Internet. Further, the term User Equipment (UE) used hereinbelow may be any kind of mobile communication device like a mobile telephone, a Personal Digital Assistant (PDA), a network card, a laptop or any other mobile communication apparatus which is capable of communicating wirelessly (via an air interface) or wirelined with a network. Although a specific protocol stack is used below to describe the present invention, any other suitable protocol stack may equally be used.

Those skilled in the art will further appreciate that the functions explained herein below may be implemented using hardware circuitry, software means, or a combination thereof. The software means may be in conjunction with a programmed microprocessor or a general purpose computer, using an Application Specific Integrated Circuit (ASIC) and/or Digital Signal Processors (DSPs). It will also be apparent that when the present invention is described as a method, it may also be embodied in a computer processor and a memory coupled to the processor, wherein the memory is encoded with one or more programs that perform the method when executed by the processor.

Figure 1A:
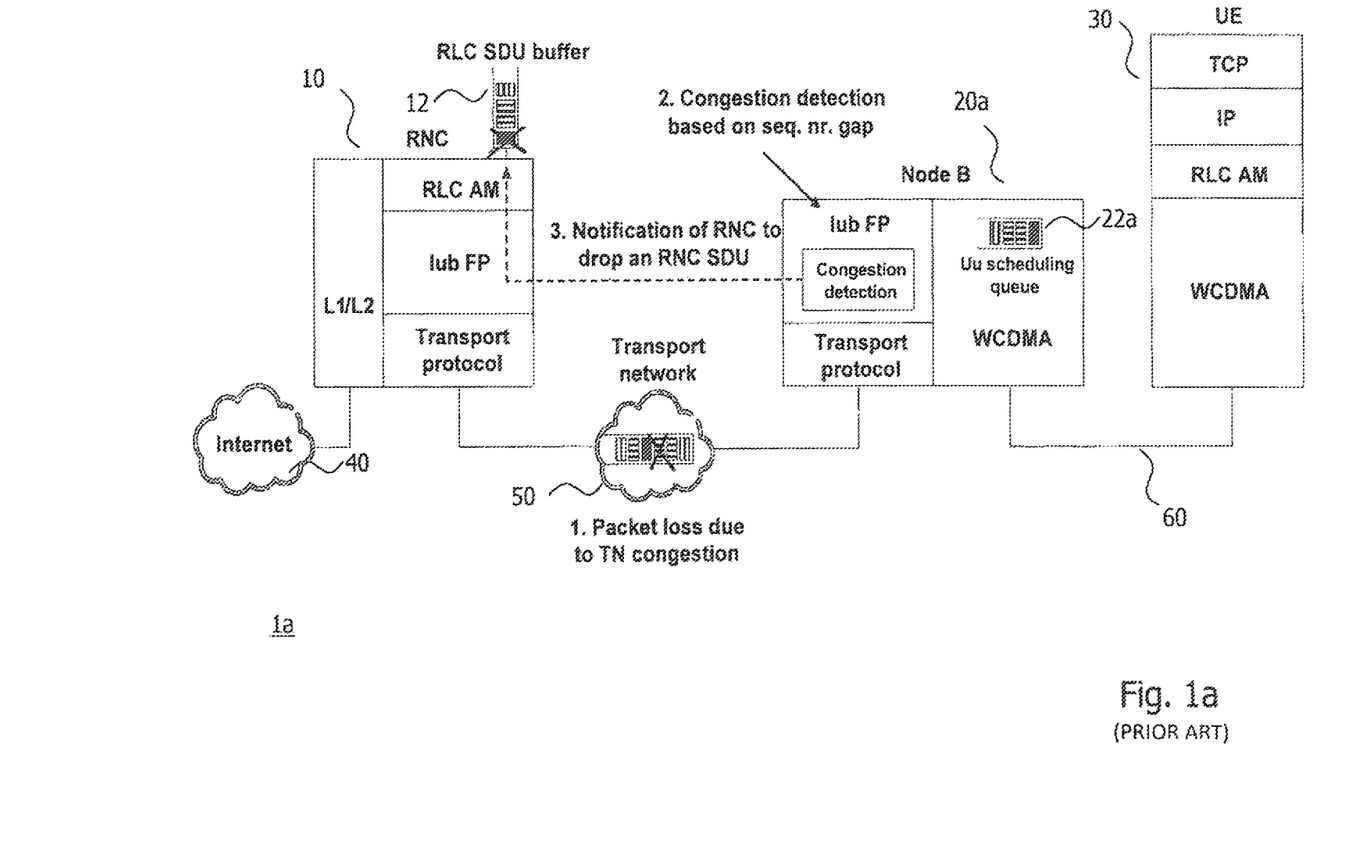
FIG. 1a is a schematic illustration of an existing solution for handling network congestion.
Figure 1B:
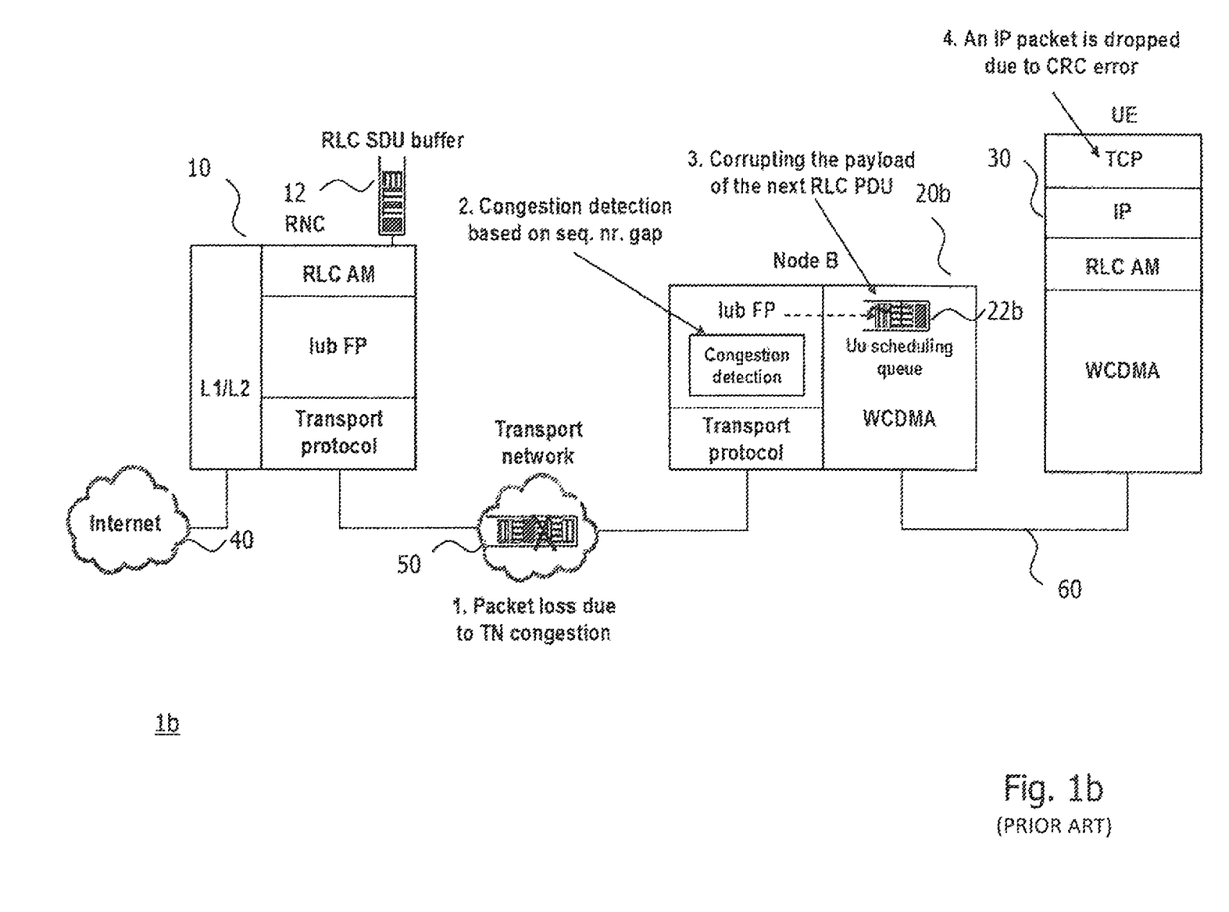
FIG. 1b is a schematic illustration of another existing solution for handling network congestion.

In FIGS. 1a and 1b two existing solutions for TCP notification are illustrated which are useful for understanding the present invention. Both existing solutions for TCP notification can be applied in a HSDPA environment.

In both FIGS. 1a and 1b, a Radio Network Controller (RNC) 10 can communicate with a Node B 20a, 20b over a Transport Network (TN) 50 and the Node B 20a, 20b can communicate with a User Equipment (UE) 30 via a radio link 60.

According to the first existing solution of FIG. 1a, in case of TN 50 congestion, the next possible Radio Link Control (RLC) Service Data Unit (SDU), i.e. IP packet, contained in the RLC SDU buffer 12 will be discarded in the RNC 10. In other words, the TN 50 congestion is detected in the Node B 20a. After that the RNC 10 is informed about the TN congestion through the Iub FP protocol and the RNC 10 discards the next possible RLC SDU from the RLC SDU buffer 12 as illustrated in FIG. 1a.

In accordance with the existing solution shown in FIG. 1a, a delayed reaction for TN congestion handling is provided. Further, the lost RLC PDU in the TN will be retransmitted by the RLC Acknowledged Mode (AM).

According to the second existing solution of FIG. 1b, in case of TN 50 congestion, the next RLC PDU to be input into the Uu scheduling queue 22b is corrupted in the Node B 20b. Due to the resulted incorrect TCP Cyclic Redundancy Check (CRC) resulting from the corruption, the TCP in the UE 30 will discard that RLC PDU (IP packet). In this way, an IP packet is indirectly dropped and the TCP is notified about the TN congestion.

However, according to the second existing solution, the corrupted RLC PDU is sent over the radio link 60 and will be dropped at the UE 30. This decreases the utilization of the radio link 60, since "useless" data is still transmitted over the radio link 60. Further, manipulation of bits of the RLC PDU is required in the Node B 20b. This solution might also cause problems in case of some Header Compression solutions. It also has to be noted that in some cases the UDP does not check checksums and therefore undesired packet corruption might happen in the system. Finally, the second existing solution increases the end-to-end RTT in case of TN congestion.

In the following, the present invention will be described without limitation with respect to UMTS terminology. In this context, a mobile communication system is an UMTS system, a radio access network is a UMTS Terrestrial Radio Access Network (UTRAN), a control node is an RNC, a radio access node is a Node B and a mobile terminal is an UE.

Figure 2:
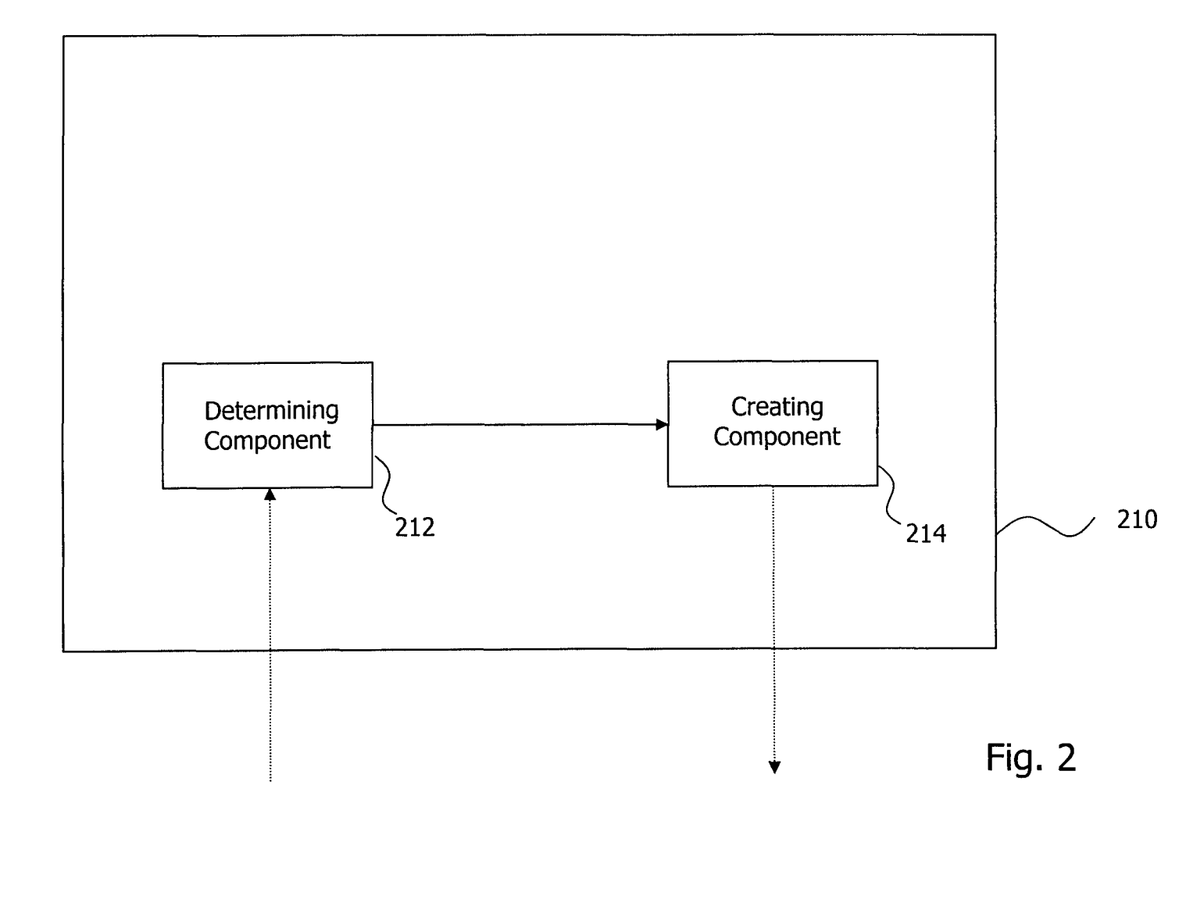
FIG. 2 is a schematic illustration of processing apparatus according to an device embodiment for handling network congestion.

A device embodiment is shown in FIG. 2. As illustrated therein, a processing apparatus 210 according to the first device embodiment is adapted for processing downlink data transmitted in a UMTS system between an RNC of an UTRAN and a UE. The processing apparatus 210 comprises a determining component 212 for determining at least one RLC PDU from a plurality of RLC PDUs transmitted by the RNC, the determined RLC PDU containing a payload, and a creating component 214 for creating at least one replacement RLC PDU to be further used instead of the determined at least one RLC PDU, wherein the at least one replacement RLC PDU contains a payload which size is smaller than the size of the payload of the determined at least one RLC PDU.

Figure 3:
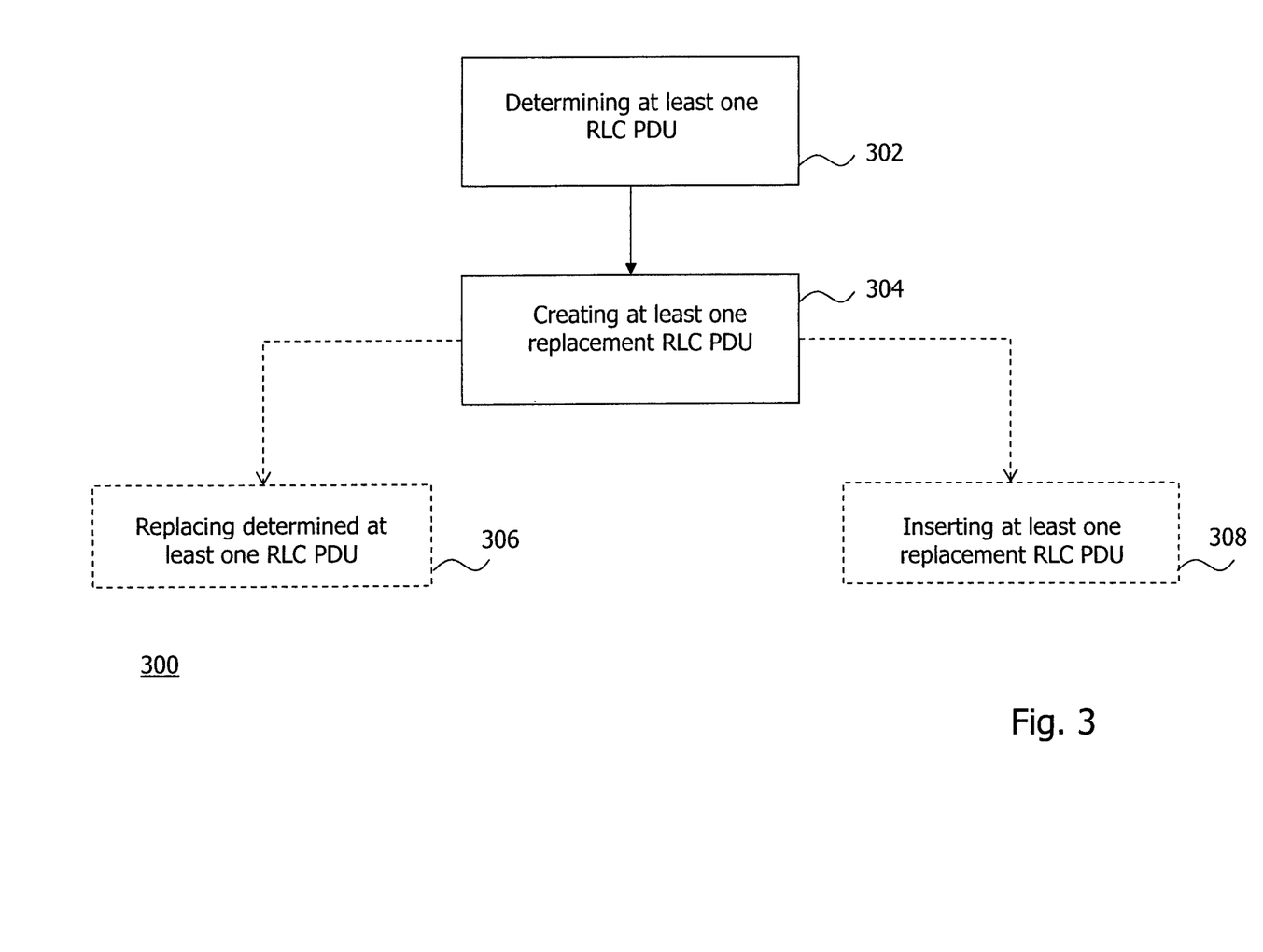
FIG. 3 is a flow diagram of a method according to a first method embodiment for handling network congestion performed in the processing apparatus according to the device embodiment of FIG. 2.

A first method embodiment is illustrated in FIG. 3. The method can be performed in the processing apparatus 210 according to the device embodiment of FIG. 2 and serves to process downlink data transmitted in a UMTS system between a RNC of an UTRAN and a UE. The method comprises the steps of determining 302, in a Node B of the UTRAN, at least one Radio Link Control, RLC, Protocol Data Unit, PDU, from a plurality of RLC PDUs transmitted by the control node, the determined at least one RLC PDU containing a payload, and creating 304, in the Node B, at least one replacement RLC PDU to be further used instead of the determined at least one RLC PDU, wherein the at least one replacement RLC PDU contains a payload which size is smaller than the size of the payload of the determined at least one RLC PDU.

Further, two optional steps are shown in FIG. 3, which may additionally be performed in the first method embodiment.

According to step 306, the determined at least one RLC PDU is replaced by the created at least one replacement RLC PDU. Step 306 may be performed when congestion on the radio link is detected. In this respect, the next RLC PDU to be input into a Uu scheduling queue of a Node B may be replaced in step 306 with the replacement RLC PDU. Alternatively or additionally, step 206 may be performed when a high priority RLC PDU is detected after a lower priority RLC PDU. In this case, the lower priority RLC PDU may be replaced by the replacement RLC PDU.

According to step 308, the determined at least one RLC PDU is inserted in the downlink data flow at a determined position. Step 308 may be performed when congestion on the transport network is detected. In this respect, the determined at least one RLC PDU may not have arrived at the Node B over the TN, but was lost in the TN due to the TN congestion. The position of the missing at least one RLC PDU may then be determined in the Node B by identifying a gap between two RLC PDUs. The at least one replacement RLC PDU may then be inserted at the determined position, e.g., in the identified gap, in step 308.

Figure 4:
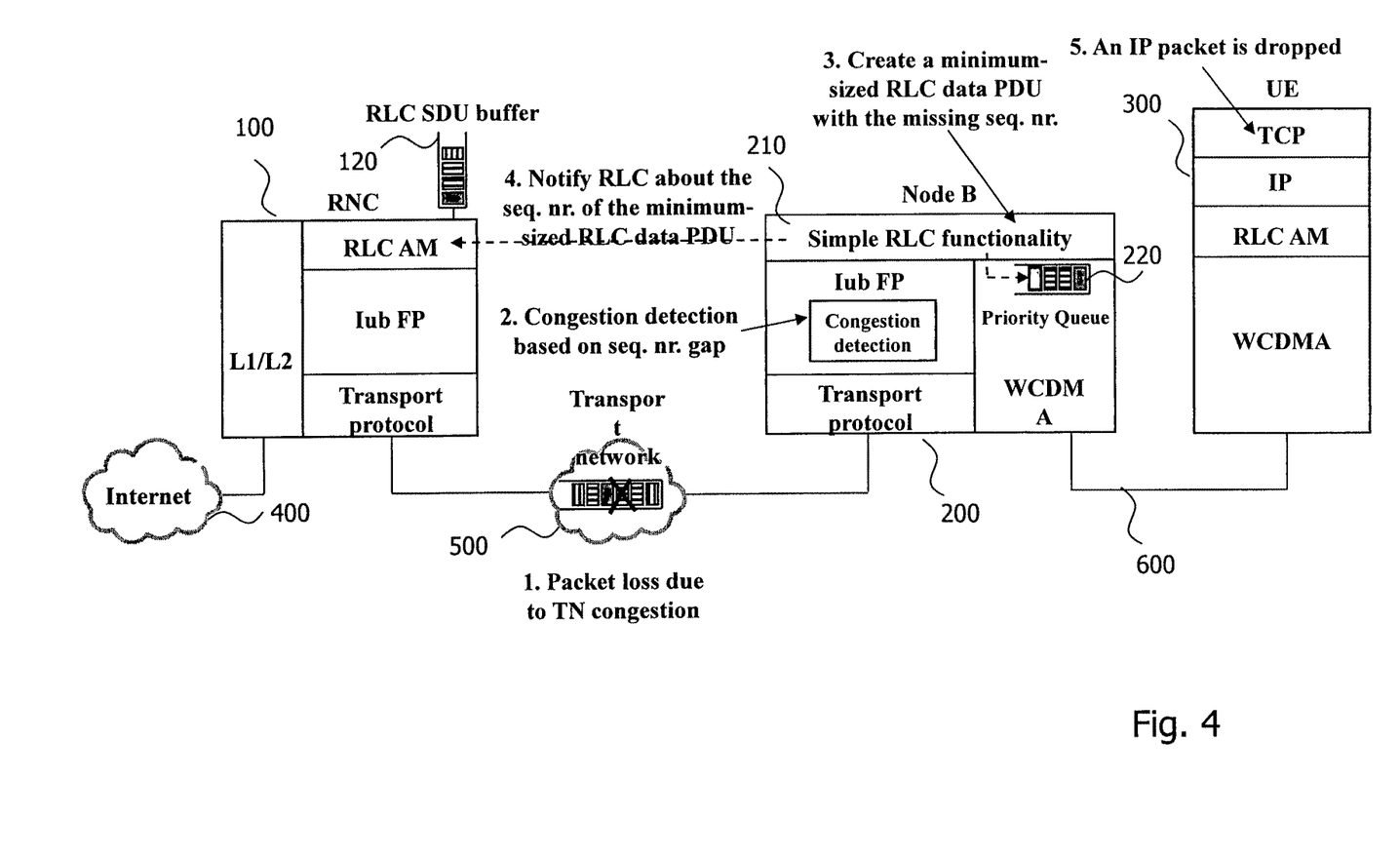
FIG. 4 is a schematic illustration of a mobile communication system according to a system embodiment for handling network congestion including the processing apparatus according to the device embodiment of FIG. 2.

In FIG. 4 a mobile communication system according to a system embodiment is shown. The processing apparatus 210 according to the device embodiment of FIG. 2 is included in the Node B 200.

By way of the system embodiment of FIG. 4 and the apparatus embodiment of FIG. 2, an efficient method is provided to inform the TCP about congestion over the radio link 600 or the TN link 500 by dropping at least one IP packet. Alternatively or additionally, the system embodiment of FIG. 4 and the apparatus embodiment of FIG. 2 make it possible to provide QoS differentiation within the same bearer by dropping low priority packets in the Node B 200 in HSDPA networks. Further, by way of the aforementioned embodiments, one or more RLC PDU(s) can be dropped in the Node B 200 such that it/they is/are not retransmitted by the RLC.

By way of example, FIG. 4 illustrates a situation in which TN congestion is detected. However, the system embodiment may alternatively or additionally be used in a situation in which radio congestion is detected. Further, FIG. 4 illustrates a situation in which priority differentiation is performed. Therefore, the Uu scheduler included in the Node B 200 will in the following without limitation be referred to as priority queue 220.

Due to TN congestion an RLC PDU transmitted by the RNC 100 is lost over the TN 500. When the TN congestion occurs and is detected, the processing apparatus 210 included in the Node B 200 reads the sequence number of the incoming RLC PDUs. When the processing apparatus 210 included in the Node B 200 detects a gap (e.g., in sequence numbers) between two RLC Data PDUs it determines that one or more RLC PDUs, namely the RLC PDU(s) with the missing sequence number(s), is/are missing. This/ these missing RLC PDU(s) has/have not been received at the Node B 200. Then, the processing apparatus 210 included in the Node B creates one or more replacement RLC PDUs and assigns the missing sequence number(s) to said created replacement RLC PDU(s). In consequence, the RLC PDU(s) lost over the TN link 500 are replaced by the created replacement PDU(s). Each of the one or more replacement RLC PDU(s) has a smaller payload size than the size of the payload of the corresponding (the replaced) RLC PDU. By way of example it is assumed that the size of the payload of each of the replacement RLC PDUs corresponds to the size of the header of a higher layer packet, e.g. an IP packet. The replacement RLC PDU(s) is/are then forwarded to the priority queue 220 in accordance with the respective assigned sequence number to be transmitted to the UE 300. The replacement RLC PDU(s) is/are then transmitted to the UE 300 in accordance with its/their position in the priority queue 220. Because of the received RLC PDU(s), the UE 300 drops a corresponding IP packet (the IP packet corresponding the received replacement RLC PDU). The IP packet drop is caused by the small size of the replacement RLC PDU(s), e.g. the minimum or empty size of the payload.

When radio link congestion occurs and is detected, the processing apparatus 210 included in the Node B 200 reads out the sequence number of the next RLC PDU to be forwarded to the priority queue 220. In other words, when the radio link congestion is detected, the sequence number of the next PDU to be input into the priority queue 220 is read. Then, an empty or minimum sized replacement RLC Data PDU with the respective sequence number is created, which replaces the actual RLC PDU (empty RLC Data PDU means that there is no payload in that PDU). Alternatively, the payload of the next PDU to be input into the priority queue 220 is reduced, e.g. emptied or minimized, and the RLC PDU having the empty or minimum payload is forwarded to the priority queue 220 to be transmitted to the UE 300.

Alternatively or additionally to the above TN link or radio link congestion handling, QoS prioritization can be performed in the processing apparatus 210 included in the Node B 200. When receiving a RLC PDU with a predetermined priority or higher in the processing apparatus 210 after a lower priority RLC PDU is received, the processing apparatus 210 drops the lower priority RLC PDU in the Node B 200. In other words, for QoS differentiation, an RLC PDU with an appropriate QoS parameter, i.e. with a QoS parameter which is lower than a predetermined threshold, will be selected for dropping.

After dropping by replacement (either due to TN congestion, radio link congestion or priority differentiation), the processing apparatus 210 of the Node B 200 may notify the RNC-side RLC about the sequence number of the replaced or empty/minimum-sized RLC Data PDU. Thus, in case of the retransmission of this PDU, the RNC-side RLC simply retransmits an empty or minimum-sized RLC PDU with the respective sequence number, thereby minimizing the extra burden on the transport links.

In this way, the UE-side RLC protocol acknowledges the empty RLC PDU (in case of successful transmission). Then, this packet will be discarded due its zero or minimum size. The TCP detects the missing packet and enters congestion avoidance state. Thus, IP packet drop is directly indicated and thereby the amount of data unnecessarily sent over the radio interface is minimized According to the latest standard of the RLC protocol, there is no limit on the minimum data size of the (flexible) RLC AM PDU in the downlink. Therefore, not only a minimum-sized RLC PDU but also an RLC PDU with empty payload will be accepted and acknowledged by the UE-side RLC entity without any modification in the UE-side RLC functionality.

Figure 5:
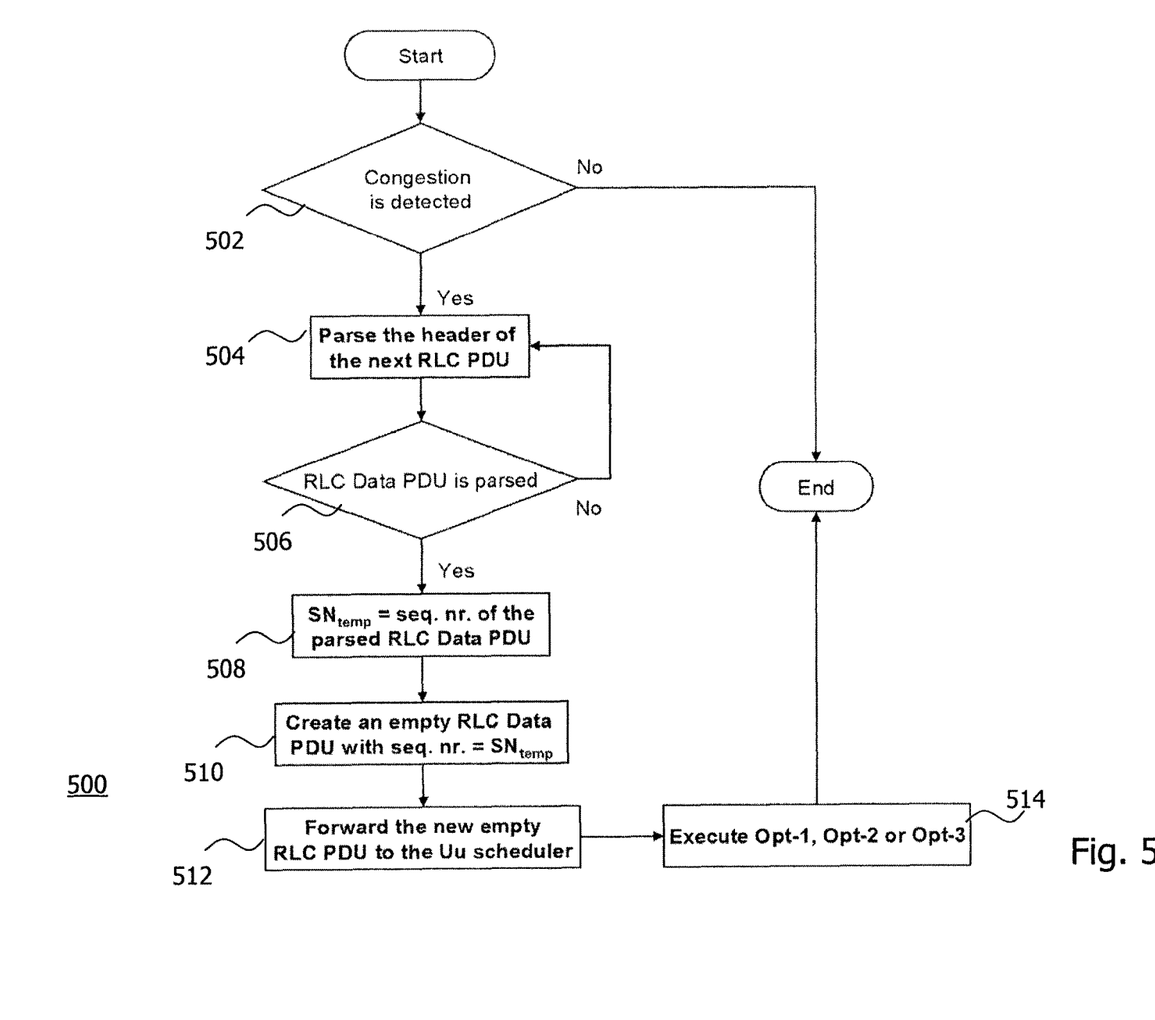
FIG. 5 is a flow diagram of a second method embodiment for handling network congestion performed in the mobile communication system according to the system embodiment of FIG. 4.

A flowchart illustrating a method according to a second method embodiment is illustrated in FIG. 5. This method may be performed in the mobile communication system according to the system embodiment shown in FIG. 4 and is used for congestion handling when radio link congestion occurs. In a similar manner, TN congestion handling or priority differentiation may be performed as described above.

At first, in step 502, congestion over the radio link is detected, e.g., by detecting a buffer overflow in the Uu scheduler or priority queue. Then, the Node B prepares for parsing the header of the next RLC PDU to be input into the Uu scheduler or priority queue in step 504. For this purpose, it is determined in step 506 whether the next RLD PDU is a RLC Data PDU. If the next RLC PDU is not an RLC Data PDU, but e.g. an RLC Status PDU, the headers of the following RLC PDU to be input into the Uu scheduler or priority queue is parsed and so on. If it is determined in step 506 that the RLC PDU is an RLC Data PDU, the sequence number of the RLC Data PDU is read in step 508. With reference to FIG. 4, the steps 504 to 508 of FIG. 5 may be described as that the processing apparatus 210 included in the Node B 200 parses the headers of the incoming RLC PDUs transmitted over the TN 500. The RLC PDUs are parsed until an RLC Data PDU is found (i.e., Status PDUs are neglected). Then, the processing apparatus 210 included in the Node B 200 reads the sequence number of the RLC Data PDU. In step 510 an empty or minimum-sized RLC PDU is created to replace the RLC Data PDU with the read sequence number. Alternatively, in step 510, the RLC Data PDU is emptied or minimized. The read sequence number is assigned to the created empty or minimum-sized RLC PDU. Then, in step 512, the newly created empty or minimum-sized RLC PDU is forwarded to the Uu scheduler or priority queue.

Finally, in step 514, three different options may be performed by the Node B regarding the handling of the empty or minimum-sized RLC PDU.

According to a first option (Opt-1), no action is taken by the Node B. This means that a congestion notification is missed in case of congestion if the empty or minimum-sized RLC PDU is retransmitted. There is only a small chance that an empty or minimum-sized RLC PDU is lost over the air, the effect of such a small reduction on the congestion control is assumed to be negligible.

According to a second option (Opt-2) a notification is sent to the RNC-side RLC in an Iub FP Control Frame containing the sequence number of the empty or minimum-sized RLC PDU. The advantage of this solution is that it does not burden the Node B, since it has to parse the header of only one RLC PDU after TN congestion is detected. Furthermore, it minimizes the additional load of the transport network, since RNC-side RLC already sends an empty or minimum-sized RLC PDU.

According to a third option (Opt-3), instead of sending a signaling message to the RLC-side RNC, it is continued to parse all of the headers of the RLC PDUs in the Node B after the empty or minimum-sized RLC PDU until at least half of the RLC window size amount of RLC PDUs have been transmitted through the Node B to make sure that the empty or minimum-sized RLC PDU is arrived successfully to the UE-side RLC entity. If the Node B identifies the sequence number of the empty or minimum-sized RLC PDU, it means that it has been retransmitted, and in this case, the Node B executes the same steps as after congestion detection, i.e., creates an empty or minimum-sized RLC PDU with the same sequence number. The advantage is that it does not require new Iub FP Control Frame.

Figure 6:
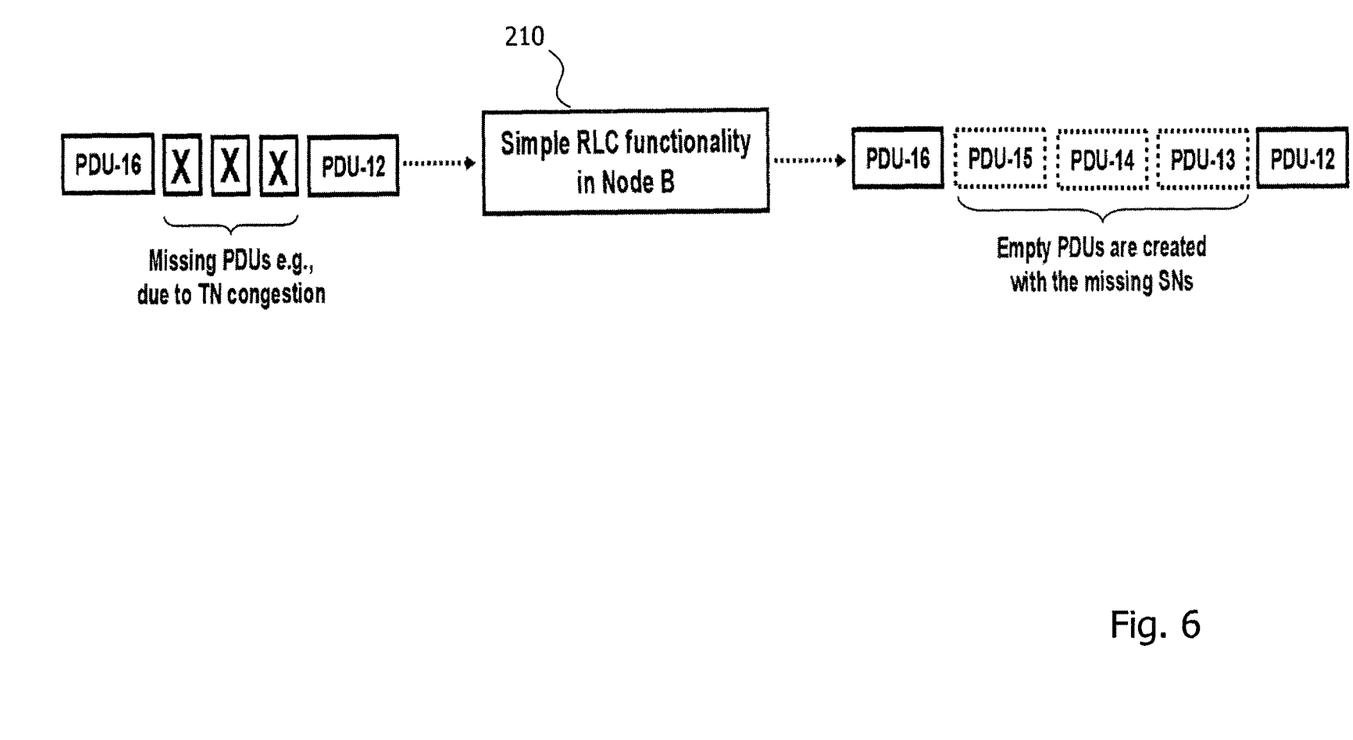
FIG. 6 is a schematic illustration of a first variant of the processing apparatus according to the device embodiment of FIG. 2.

In case multiple RLC PDUs are congested (i.e., identified as missing or marked using the flag of Explicit Congestion Notification (ECN)), the proposed simple RLC functionality in the Node B can send multiple empty or minimum-sized RLC PDUs towards the UE in place of the congested ones. This variant of the processing apparatus 210 according to the device embodiment of FIG. 2 is illustrated in FIG. 6. As shown by way of example in FIG. 6, RLC PDU-13, RLC PDU-14 and RLC PDU-15 were lost over the TN, while only RLC PDU-12 and RLC PDU-16 have been received by the Node B. The processing apparatus identifies the missing RLC PDUs RLC PDU-13, RLC PDU-14 and RLC PDU-15 by determining that there is a gap of three RLC PDUs between RLC PDU-12 and RLC PDU-16. Therefore, the processing apparatus 210 creates three replacement RLC PDUs having the missing sequence numbers 13, 14 and 15 and inserts the created RLC PDUs at the correct positions related to the sequence numbers 13, 14 and 15.

Figure 7:
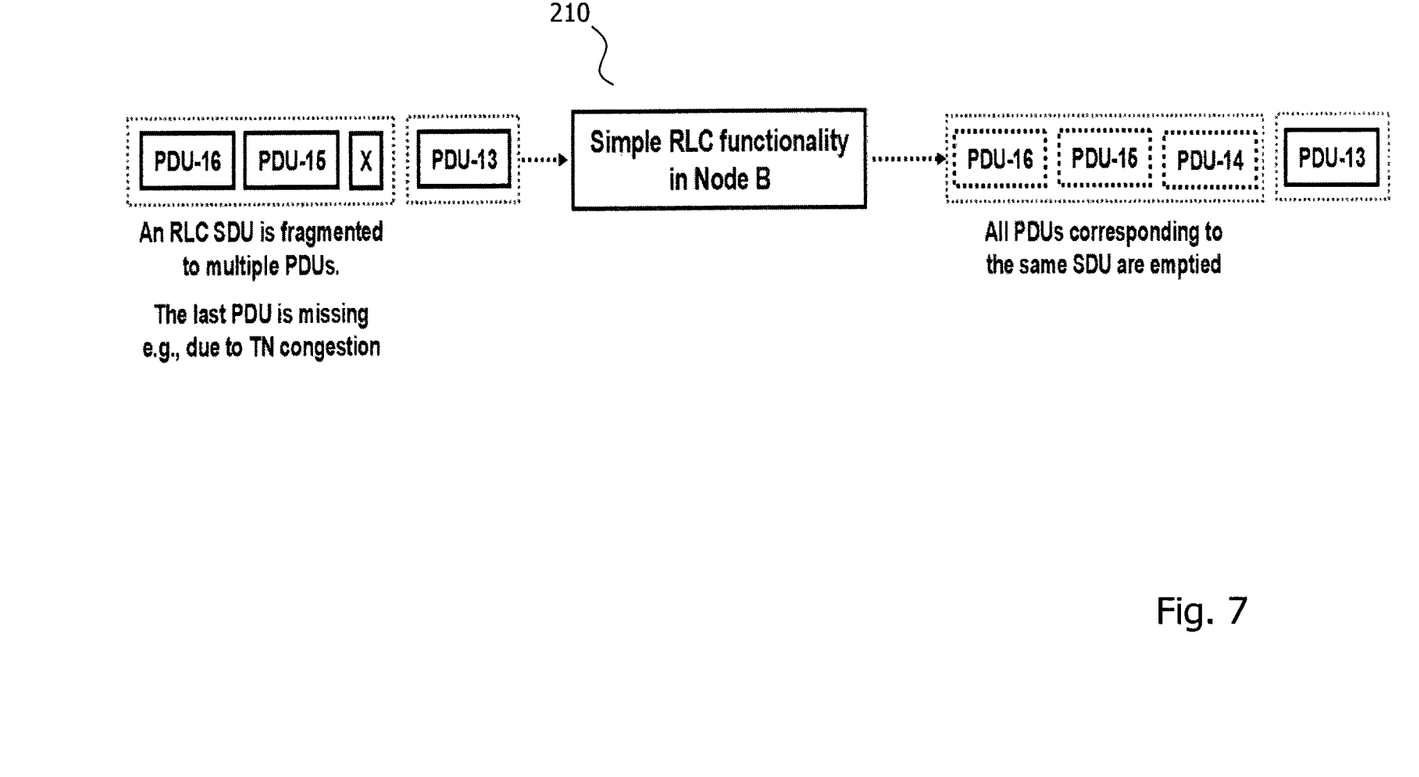
FIG. 7 is a schematic illustration of a second variant of the processing apparatus according to the device embodiment of FIG. 2.

When a congested RLC PDU contains only a fraction of an RLC SDU, then all of the PDUs that belong to the same SDU are discarded in order to decrease the load of the radio link. This is especially beneficial in case of radio congestion, since these RLC PDUs will be dropped anyway at the UE-side. This variant of the processing apparatus 210 according to the device embodiment of FIG. 2 is illustrated in FIG. 7. As can be seen in FIG. 7, RLC PDU-14 is missing because of TN congestion. However, the missing RLC PDU-14 contains only a fraction of an RLC SDU. The other fractions of the RLC SDU are contained in RLC PDU-15 and RLC PDU-16. Therefore, the processing apparatus 210 does not only create one replacement RLC PDU with the missing sequence number 14, but two further replacement RLC PDUs with the sequence numbers 15 and 16.

Different methods exist for detecting congestion. For example, in HSDPA, the congestion in the transport network can be detected by the Iub FP protocol based on missing Iub FP sequence number(s). Further, radio congestion can be identified based on, e.g., the length of the Priority Queue in the Node B.

Instead of or in addition to replacing an RLC PDU when congestion is detected, within bearer QoS differentiation may be performed by triggering the execution of the replacement not (only) when congestion occurs, but (also) in case a higher priority packet arrives to the Node B. In this case, all of the lower priority RLC PDUs ahead of the high priority packet are emptied in the priority queue.

Solving the problem of dropping RLC SDUs in the Node B helps to support providing QoS differentiation within bearer, since priority to urgent traffic (e.g., VoIP frames) is provided by dropping low priority packets (e.g., FTP) in the Uu scheduling queue (also called priority queue or Priority Queue (PQ)).

By way of the above-described embodiments, the utilization of the radio and/or TN links may be increased by avoiding transmitting data that will be dropped at the receiver side. Further, end-to-end RTT may be decreased. Still further, within bearer QoS differentiation may be achieved by dropping RLC Data PDU containing low priority traffic (e.g., FTP). Finally, the implementation works without changes in UE.

It is believed that many advantages of the present invention will be fully understood from the foregoing description, and it will be apparent that various changes may be made in the form, construction and arrangement of the exemplary aspects thereof without departing from the scope of the invention or without sacrificing all of its advantages. Because the invention can be varied in many ways, it will be recognized that the invention should be limited only by the scope of the following claims.

The invention claimed is:

1. A method of processing downlink data transmitted in a mobile communication system between a control node of a radio access network and a mobile terminal, the method comprising:
    determining, in a radio access node of the radio access network, at least one Radio Link Control (RLC) Protocol Data Unit (PDU) from a plurality of RLC PDUs transmitted by the control node, the determined at least one RLC PDU comprising a payload;
    creating, in the radio access node, at least one replacement RLC PDU to be further used instead of the determined at least one RLC PDU, wherein the at least one replacement RLC PDU comprises a payload which size is smaller than the size of the payload of the determined at least one RLC PDU and wherein the at least one replacement RLC PDU comprises a sequence number determined based on the determined at least one RLC PDU comprising the payload; and
    transmitting, by the radio access node, the sequence number of the at least one replacement RLC PDU to the control node of the mobile communication system.

2. The method of claim 1, wherein the step of determining is triggered when congestion of the downlink data in a transport network provided between the control node and the radio access node is detected.

3. The method of claim 1, further comprising determining the at least one RLC PDU by identifying, in the radio access node, which of the plurality of RLC PDUs is not received at the radio access node.

4. The method of claim 1, wherein the step of determining is triggered when congestion of the downlink data on a radio link provided between the radio access node and the mobile terminal is detected.

5. The method of claim 1, further comprising determining the at least one RLC PDU by detecting, in the radio access node, that the at least one RLC PDU is the next RLC PDU to be input into a transmission scheduler of the radio access node for scheduling transmission of RLC PDUs to the mobile terminal.

6. The method of claim 1, wherein the step of creating comprises reducing, in the radio access node, the payload contained in the determined at least one RLC PDU.

7. The method of claim 1, further comprising parsing headers of at least a subset of the plurality of RLC PDUs to determine the at least one RLC PDU.

8. The method of claim 1, further comprising receiving, by the radio access node, at least one payload-containing RLC PDU comprising the sequence number of the at least one replacement RLC PDU.

9. The method of claim 1, further comprising temporarily storing the sequence number of the at least one replacement RLC PDU in the radio access node.

10. The method of claim 9, further comprising identifying, in the radio access node, at least one of the plurality of RLC PDUs having a sequence number that corresponds to the stored sequence number, and replacing, in the radio access node, the identified at least one of the plurality of RLC PDUs with the at least one replacement RLC PDU.

11. The method of claim 1, wherein the number of the at least one replacement RLC PDU corresponds to the number of the determined at least one RLC PDU.

12. The method of claim 1, further comprising when the at least one determined RLC PDU contains only a fraction of an RLC Service Data Unit, SDU, creating multiple replacement RLC PDUs depending on the number of the plurality of RLC PDUs belonging to said SDU.

13. The method of claim 1, further comprising monitoring, in the radio access node, a priority of the plurality of RLC PDUs.

14. The method of claim 1, wherein the step of determining comprises selecting at least one RLC PDU ahead of an RLC PDU having a priority that is higher than a predetermined priority as the at least one replacement RLC PDU.

15. The method of claim 1, wherein the determined at least one RLC PDU comprises a packet according to a higher layer protocol related to the downlink data, wherein the packet according the higher layer protocol comprises header data and payload data, and the size of the payload of the replacement RLC PDU is equal to or smaller than the size of the header data of the packet according to the higher layer protocol.

16. The method of claim 15, wherein the size of the replacement RLC PDU payload is the minimum valid length of the packet according to the higher layer protocol or wherein the size of the replacement RLC PDU payload is 20 bytes or wherein the size of the replacement RLC PDU payload is zero bytes or wherein the replacement RLC PDU payload consists of the header of the packet according to said higher layer protocol.

17. The method of claim 1, wherein the mobile communication system is a Universal Mobile Telecommunications System (UMTS) communication system and/or the radio access network is a UMTS Terrestrial Radio Access Network (UTRAN) and/or the control node is a Radio Network Controller (RNC) and/or the radio access node is a NodeB and/or the mobile terminal is a User Equipment (UE) and/or the higher layer protocol is a Internet Protocol (IP).

18. A computer program product comprising a non-transitory computer-readable recording medium storing program code that performs the method of claim 1 when the program code is run on a computer system.

19. A processing apparatus for processing downlink data transmitted in a mobile communication system between a control node of a radio access network and a mobile terminal, the processing apparatus comprising:
    a processor; and
    memory encoded with one or more programs that, when executed by the processor, cause the processor to perform operations comprising:
    determining at least one Radio Link Control (RLC) Protocol Data Unit (PDC) from a plurality of RLC PDUs transmitted by the control node, the determined at least one RLC PDU comprising a payload; and
    creating at least one replacement RLC PDU to be further used instead of the determined at least one RLC PDU, wherein the at least one replacement RLC PDU comprises a payload which size is smaller than the size of the payload of the determined at least one RLC PDU and wherein the at least one replacement RLC PDU comprises a sequence number determined based on the determined at least one RLC PDU comprising the payload; and
    transmitting, by the radio access node, the sequence number of the at least one replacement RLC PDU to the control node of the mobile communication system.

20. The processing apparatus of claim 19, wherein the processor and the memory are part of a radio access node.

21. The processing apparatus of claim 20, wherein the radio access node is a NodeB.

22. The processing apparatus of claim 20, wherein the processor and the memory are part of a mobile communication system comprising a mobile terminal and a control node.

\* \* \* \* \*